US010043501B2

(12) United States Patent
Nagasawa

(10) Patent No.: US 10,043,501 B2
(45) Date of Patent: Aug. 7, 2018

(54) SIGNAL PROCESSING DEVICE

(71) Applicant: YAMAHA CORPORATION, Hamamatsu-shi (JP)

(72) Inventor: Tetsuya Nagasawa, Hamamatsu (JP)

(73) Assignee: YAMAHA CORPORATION, Hamamatsu-Shi (JP)

(*) Notice: Subject to any disclaimer, the term of this patent is extended or adjusted under 35 U.S.C. 154(b) by 0 days.

(21) Appl. No.: 15/585,675

(22) Filed: May 3, 2017

(65) Prior Publication Data

US 2017/0330541 A1 Nov. 16, 2017

(30) Foreign Application Priority Data

May 11, 2016 (JP) ................................ 2016-095217
Apr. 3, 2017 (JP) ................................ 2017-073856

(51) Int. Cl.
*H04B 1/00* (2006.01)
*G10H 1/00* (2006.01)
*G10H 1/46* (2006.01)

(52) U.S. Cl.
CPC ............ *G10H 1/0058* (2013.01); *G10H 1/46* (2013.01); *G10H 2240/175* (2013.01)

(58) Field of Classification Search
CPC ................ H04H 60/04; G10H 1/0058; G10H 2240/031; G10H 2250/035; G10H 1/46
USPC .............................. 381/74, 109, 58–59, 119
See application file for complete search history.

(56) References Cited

U.S. PATENT DOCUMENTS

| | | | | |
|---|---|---|---|---|
| 8,119,900 | B2 | 2/2012 | Skillings | |
| 8,320,584 | B2 * | 11/2012 | Sheets | H04H 60/04 381/119 |
| 2003/0059067 | A1 | 3/2003 | Shibata | |
| 2007/0256549 | A1 | 11/2007 | Yamada | |
| 2007/0263884 | A1 * | 11/2007 | Bedingfield, Sr. | H04S 7/00 381/119 |
| 2009/0282967 | A1 | 11/2009 | Skillings | |
| 2010/0145486 | A1 * | 6/2010 | Sheets | H04H 60/04 700/94 |
| 2012/0027229 | A1 * | 2/2012 | Bruey | H04R 3/00 381/119 |
| 2013/0329900 | A1 | 12/2013 | Price | |

(Continued)

FOREIGN PATENT DOCUMENTS

| | | | |
|---|---|---|---|
| JP | S6075140 | A | 4/1985 |
| JP | H119515 | Y2 | 6/1989 |
| JP | 2014107658 | A | 6/2014 |

(Continued)

OTHER PUBLICATIONS

Extended European Search Report issued in Appln. No. 17169484.7 dated Oct. 6, 2017.

*Primary Examiner* — Disler Paul
(74) *Attorney, Agent, or Firm* — Rossi, Kimms & McDowell LLP

(57) ABSTRACT

A signal processing device includes: connecting terminals each of which is connectable to respective ones of a plurality of other signal processing devices that are different from the subject signal processing device; an analog bus connected to the connecting terminals; an input terminal connected to the analog bus and that accepts an input of an audio signal; and an output terminal connected to the analog bus and that outputs an audio signal to a sound emitting device.

5 Claims, 6 Drawing Sheets

(56) References Cited

U.S. PATENT DOCUMENTS

| | | | | |
|---|---|---|---|---|
| 2014/0064519 | A1 * | 3/2014 | Silfvast | H04H 60/04 381/119 |
| 2014/0211958 | A1 * | 7/2014 | Zhang | H04R 1/1041 381/74 |

FOREIGN PATENT DOCUMENTS

| | | | |
|---|---|---|---|
| JP | 2014204205 | A | 10/2014 |
| WO | 0106751 | A1 | 1/2001 |

* cited by examiner

SIGNAL PROCESSING DEVICE

BACKGROUND OF THE INVENTION

The present invention relates to a technique for processing audio signals that represent sounds such as instrumental or vocal sounds.

FIELD OF THE INVENTION

Various techniques have been proposed that enable a plurality of musicians to perform music together using a plurality of musical instruments. For example, U.S. Pat. No. 8,119,900 (hereinafter, Patent Document 1) discloses a system including a plurality of units, and that enables musicians to perform music together. In the system, audio signals are each supplied from respective electric musical instruments to corresponding units. An audio signal is supplied from an electric musical instrument to a corresponding unit, and is then further supplied to other units via a different path used by other of the respective musical instruments to further supply audio signals. Each unit has a mixer that combines an audio signal supplied from a corresponding electric musical instrument with audio signals supplied from other units and that outputs the combined signals to headphones. According to the technique disclosed in Patent Document 1, it is possible for a plurality of musicians to perform music together while each musician listens to the performance of the other musicians without emitting the sound of performance into the surrounding air.

The technique disclosed in Patent Document 1, suffers from a drawback in that a complicated configuration must be implemented to realize the technique. Namely, an audio signal that is supplied to a unit from an electric musical instrument is required to be supplied to other units via a different path used by other of the respective musical instruments to further supply audio signals; and, moreover, a mixer is also required to be mounted to each unit to combine (the supplied) audio signals.

SUMMARY OF THE INVENTION

Taking the above drawback of Patent Document 1 into consideration, it is an object of the present invention to provide a simple configuration for mixing audio signals and outputting the mixed audio signals.

According to one aspect, a signal processing device of the present invention includes: a plurality of connecting terminals each of which is connected to respective ones of a plurality of signal processing devices different from the subject signal processing device, among the plurality of signal processing devices; an analog bus connected to the plurality of connecting terminals; an input terminal connected to the analog bus and that accepts an input of a first audio signal; and an output terminal connected to the analog bus and that outputs a second audio signal to a sound emitting device.

According to another aspect, a signal processing device includes: at least one connecting terminal connectable to another signal processing device that is different from the subject signal processing device; an analog bus connected to the at least one connecting terminal; an input terminal connected to the analog bus and that accepts an input of a first audio signal; an output terminal connected to the analog bus and that outputs an second audio signal to a sound emitting device; a second resistive element; and a connection switcher that insulates from the analog bus the second resistive element when the another signal processing device is connected to the plurality of connecting terminals and that, connects the second resistive element to the analog bus when the another signal processing devices is not connected to a connecting terminal.

According to yet another aspect, a signal processing device includes: at least one connecting terminal connectable to another signal processing device that is different from the subject signal processing device; an analog bus connected to the at least one connecting terminal; an input terminal connected to the analog bus and that accepts an input of a first audio signal; an output terminal connected to the analog bus and that outputs an second audio signal to a sound emitting device; an adjuster that adjusts a volume of an audio signal supplied to a path branched from a path between the input terminal and the analog bus; and a signal adder disposed between the analog bus and the output terminal and that adds an audio signal supplied from the analog bus and the audio signal that has been adjusted by the adjuster, and the adjuster includes a reversed phase generator that performs inversion of a phase and the adjustment of a volume with respect to the audio signal.

DESCRIPTION OF THE EMBODIMENTS

First Embodiment

Figure 1:
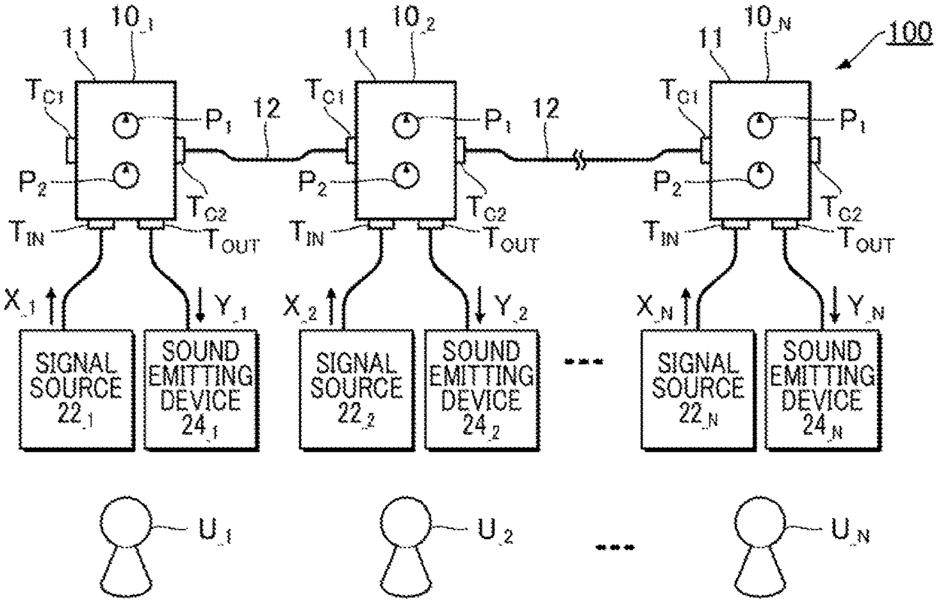
FIG. 1 illustrates a configuration of a sound processing system according to a first embodiment of the present invention.

FIG. 1 illustrates a configuration of a sound processing system 100 according to the first embodiment of the present invention. The sound processing system 100 according to the first embodiment is a system used for a plurality of users (N users) $U_1$ to $U_N$ to play musical instruments (N being a natural number of two or more). As exemplified in FIG. 1, the sound processing system 100 according to the first embodiment includes: a plurality of signal processing devices (N signal processing devices) $\mathbf{10}\_1$ to $\mathbf{10}\_N$, each of which is configured separately from one another; and a plurality of connecting cables 12 ((N−1) connecting cables 12) that connect the different signal processing devices 10_$_n$ (n=1 to N) to each other.

A signal source 22_$_n$ and a sound emitting device 24_$_n$ are connected to each signal processing device 10_$_n$. The signal source 22_$_n$ supplies to the signal processing device 10_$_n$ an analog audio signal (an example of a first audio signal) X_$_n$ that represents a sound such as an instrumental or vocal sound. For example, a preferable example of the signal source 22_$_n$ is an electric musical instrument that outputs an audio signal X_$_n$ of a performance sound according to a performance by a user U_$_n$. More specifically, electric musical instruments of various types such as string instruments (e.g., guitars or violins), keyboard instruments (e.g., pianos), or percussion instruments (e.g., drums) are used as the signal source 22_$_n$. It is also possible to use, as the signal source 22_$_n$, a sound receiving device (e.g., a microphone) that receives a performing sound of a musical instrument or a vocal performing sound of a singer, to generate an audio signal X_$_n$. A playback device (e.g., a portable music player) that outputs an audio signal X_$_n$ that is stored in a recording medium is also preferable as the signal source 22_$_n$. The audio signal X_$_n$ is either stereo or monaural.

The signal processing device 10_$_n$ is an analog mixer that supplies an audio signal (an example of a second audio signal) Y_$_n$ to the sound emitting device 24_$_n$, the audio signal Y_$_n$ being obtained by combining N streams of audio signals X_$_1$ to X_$_N$ generated by the different signal sources 22_$_n$. The sound emitting device 24_$_n$ may, for example, be headphones or earphones worn by a user U_$_n$ on his/her ears, and that reproduces a sound represented by the audio signal Y_$_n$ supplied from the signal processing device 10_$_n$ (i.e., an ensemble sound obtained by musicians playing music together). In this way, each user U_$_n$ can perform music while listening through the sound emitting device 24_$_n$ to the sound of N users U_$_1$ to U_$_N$ playing music together. This configuration is common among the N signal processing devices 10_$_1$ to 10_$_N$, and therefore, the following explanation focuses on a freely selected single signal processing device 10_$_n$.

As exemplified in FIG. 1, the signal processing device 10_$_n$ includes a case 11 that is approximately cuboid in shape. A plurality of operators P ($P_1$ and $P_2$) are mounted to the upper surface of the case 11 and accept the operation of a user U_$_n$. Each operator P according to the first embodiment is a knob that the user U_$_n$ can freely rotate. By appropriately operating a desired operator P, the user U_$_n$ can adjust a characteristic of an audio signal Y_$_n$ generated by the signal processing device 10_$_n$. Positioning of the operators P is not limited to the upper surface of the case 11.

As exemplified in FIG. 1, the signal processing device 10_$_n$ includes a plurality of terminals ($T_{IN}$, $T_{OUT}$, $T_{C1}$, and $T_{C2}$). More specifically, an input terminal $T_{IN}$, an output terminal $T_{OUT}$, a connecting terminal $T_{C1}$, and a connecting terminal $T_{C2}$ are mounted to the sides of the case 11. Positioning of the terminals is not limited to the sides of the case 11.

The input terminal $T_{IN}$ is a stereo jack to and from which the signal source 22_$_n$ can be freely connected and disconnected. The terminal $T_{IN}$, accepts input of an audio signal X_$_n$ supplied from the signal source 22_$_n$. The output terminal $T_{OUT}$ is a stereo jack to and from which the sound emitting device 24_$_n$ can be freely connected and disconnected. The terminal $T_{OUT}$ outputs to the sound emitting device 24_$_n$ an audio signal Y_$_n$ generated by the signal processing device 10_$_n$. Alternatively, an audio signal X, may be transmitted by radio from the signal source 22_$_n$ to the signal processing device 10_$_n$; and/or an audio signal Y_$_n$ may be transmitted by radio from the signal processing device 10_$_n$ to the sound emitting device 24_$_n$. The scheme of radio communication between the signal source 22_$_n$ and the signal processing device 10_$_n$, as well as that between the signal processing device 10_$_n$ and the sound emitting device 24_$_n$ may be freely chosen However, it is of note that Near Filed Communication, such as Bluetooth (registered trademark), is preferable.

The connecting cable $T_{C1}$ and the connecting cable $T_{C2}$ of the signal processing device 10_$_n$ are terminals for connecting the signal processing device 10_$_n$ (the subject device) and other signal processing devices (hereinafter, other devices). The connecting cable $T_{C1}$ and the connecting cable $T_{C2}$ according to the first embodiment are stereo jacks to and from which the plugs at the end of connecting cables 12 are freely connected and disconnected. A connecting cable 12 is a cable that electrically connects a signal processing device 10_$_{n1}$ and a signal processing device 10_$_{n2}$ (n1=1 to N, n2=1 to N, n1≠n2). For example, stereo shielded cables are preferably used as connecting cables 12.

As exemplified in FIG. 1, either one or both of the connecting terminal $T_{C1}$ and the connecting terminal $T_{C2}$ of the signal processing device 10_$_n$ is/are connected, via connecting cable(s) 12, to connecting terminal $T_{C1}$ or/and connecting terminal $T_{C2}$ of other device(s). Accordingly, as exemplified in FIG. 1, N signal processing devices 10_$_1$ to 10_$_N$ are connected in series. More specifically, the connecting terminal $T_{C1}$ of each of the second to the $N^{th}$ signal processing devices 10_$_n$ is connected to the connecting terminal $T_{C2}$ of the immediately preceding signal processing device 10_$_{n-1}$. The connecting terminal $T_{C1}$ of the signal processing device 10_$_1$ at one end of a sequence of N signal processing devices 10_$_n$ and the connecting terminal $T_{C2}$ of the signal processing device 10_$_N$ at the other end are in an open, separate state, and are not connected to any other devices. However, it is also possible to interconnect the connecting terminal $T_{C1}$ of the signal processing device 10_$_1$ and the connecting terminal $T_{C2}$ of the signal processing device 10_$_N$ (i.e., the N signal processing devices 10_$_1$ to 10_$_N$ may be connected in a circle).

An N number (hereinafter, the connection number) of signal processing devices 10_$_n$ that are interconnected may be freely changed. More specifically, N signal processing devices 10_$_1$ to 10_$_N$ that correspond to a number of users U_$_n$ actually participating in a performance are connected. For example, in a case where two people (N=2), user U_$_1$ and user U_$_2$, are to perform music together, a signal processing device 10_$_1$ and a signal processing device 10_$_2$ are interconnected by one connecting cable 12. In a case where five people (N=5), users U_$_1$ to U_$_5$, are to perform music together, signal processing devices 10_$_1$ to 10_$_5$ are interconnected by four connecting cables 12.

Meanwhile, Patent Document 1 discloses a configuration including a station (docking station) in which a predetermined number of spaces (docks) are formed (hereinafter, comparative example 1). In comparative example 1, it is not possible to connect units of a number that exceeds the total number of the spaces since each of a plurality of units for inputting and outputting audio signals is docked in respective spaces of the station. Accordingly, the configuration disclosed in comparative example 1 is subject to a problem in that a total number of performers who are able to perform music together is limited. According to the first embodiment, the number N of connected signal processing devices 10_$_n$ can be freely changed, and there is no limit to the number of users U_$_n$. In addition, in using the system of comparative example 1, users will be obliged to wait before starting to perform music together if a user who possesses and takes care of the station is not present. According to the first embodiment, even in a case that not all users are present, those users who are present can begin practicing music together by interconnecting N signal processing devices 10$_{1}$ to 10$_{N}$, where N is equivalent to the number of users U$_{n}$ who are present. Furthermore, in comparative example 1, it is necessary for a particular user to purchase and take care of the station, whereas according to the first embodiment, individual users U$_{n}$ can each purchase and take care of their own signal processing device 10$_{n}$.

Figure 2:
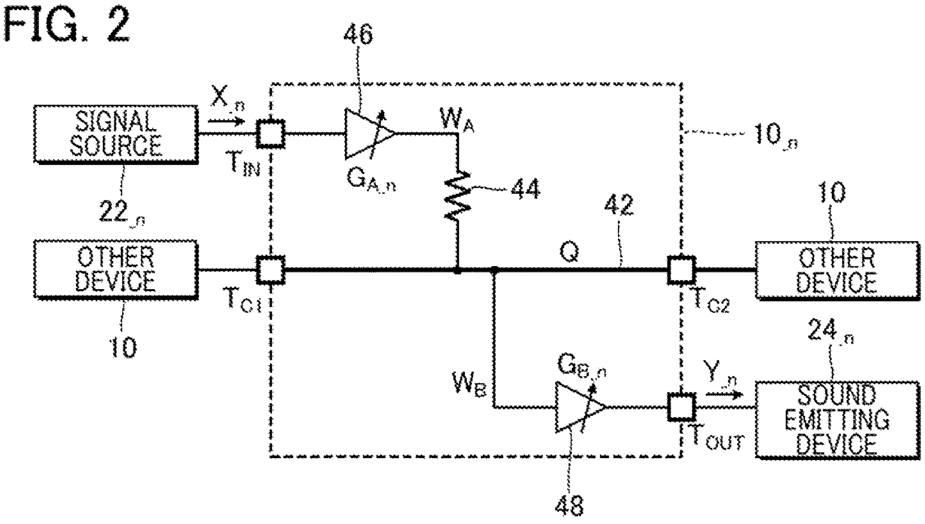
FIG. 2 illustrates a configuration of a signal processing device.

FIG. 2 illustrates an electric configuration of the signal processing device 10$_{n}$. As exemplified in FIG. 2, the signal processing device 10$_{n}$ according to the first embodiment is an analog circuitry that includes an analog bus 42, a resistive element 44, a first adjuster 46, and a second adjuster 48. These elements are mounted inside the case 11. In actuality, the analog bus 42, the resistive element 44, the first adjuster 46, and the second adjuster 48 are mounted for each of the left and right channels. However, for the sake of convenience in the following explanation, reference will be made to one channel only, namely, either a left or right channel. The following alternative configurations may also be assumed: that is, the first adjuster 46 or the second adjuster 48 may be mounted to the exterior of the case 11; or the first adjuster 46 and the second adjuster 48 may be omitted from the signal processing device 10$_{n}$. The configuration in which the first adjuster 46 and the second adjuster 48 are omitted has an advantage in that a circuitry size and manufacturing cost of the signal processing device 10$_{n}$ can be reduced.

The analog bus 42 is a signal line that transmits analog signals. As FIG. 2 exemplifies, the analog bus 42 is connected to the connecting terminal $T_{C1}$ and the connecting terminal $T_{C2}$. More specifically, one end of the analog bus 42 is connected to the connecting terminal $T_{C1}$ and the other end is connected to the connecting terminal $T_{C2}$. Accordingly, where N signal processing devices 10$_{1}$ to 10$_{N}$ are interconnected, as in the example of FIG. 1, the analog buses 42 of the signal processing devices 10$_{n}$ are electrically connected across the N signal processing devices 10$_{1}$ to 10$_{N}$. In other words, a single bus unit is formed of the analog buses 42 of the N signal processing devices 10$_{1}$ to 10$_{N}$ interconnected by connecting cables 12. In FIG. 1, an example configuration is shown in which the connecting terminal $T_{C1}$ of a signal processing device 10$_{n}$ and the connecting terminal $T_{C2}$ of a signal processing device 10$_{n-1}$ are connected. However, the connecting terminal $T_{C1}$ and the connecting terminal $T_{C2}$ are electrically equivalent. Thus, as will be understood from FIG. 2, it is also possible to mutually connect the connecting terminals $T_{C1}$ of different signal processing devices 10$_{n}$, or to mutually connect the connecting terminals $T_{C2}$ of different signal processing devices 10$_{n}$. That is, it is not necessary to distinguish between the connecting terminal $T_{C1}$ and the connecting terminal $T_{C2}$ when using the device. As exemplified in FIG. 1, where N signal processing devices 10$_{1}$ to 10$_{N}$ are connected in series, the analog buses 42 of the signal processing devices 10$_{n}$ convey a common audio signal Q that is a mix of audio signals X$_{1}$ to X$_{N}$ of N streams.

As exemplified in FIG. 2, the resistive element 44 and the first adjuster 46 are disposed on a path $W_A$ situated between the input terminal $T_{IN}$ and the analog bus 42. The resistive element 44 (an example of a first resistive element) consists of an electric resistance between the input terminal $T_{IN}$ and the analog bus 42. The first adjuster 46 is disposed between the input terminal $T_{IN}$ and the resistive element 44, and is used to adjust a volume of an audio signal X$_{n}$ that is supplied from the signal source 22, to the input terminal $T_{IN}$. More specifically, the first adjuster 46 is an amplifier that amplifies an audio signal X$_{n}$ by a variable gain $G_{A\_n}$. The gain $G_{A\_n}$ of the first adjuster 46 is set as variable depending on how the operator $P_1$ of the signal processing device 10$_{n}$ is operated (the position to which the operator $P_1$ is rotated, i.e., the angle of rotation of the operator $P_1$). As will be understood from the above example, an audio signal X$_{n}$ that is supplied from the signal source 22$_{n}$ to the input terminal $T_{IN}$ is then supplied to the analog bus 42 through the resistive element 44 after its volume has been adjusted by the first adjuster 46. The first adjuster 46 according to the first embodiment also functions as a buffer amplifier that reduces an influence of the output impedance of the signal source 22$_{n}$.

As exemplified in FIG. 2, the second adjuster 48 is disposed on a path $W_B$ situated between the analog bus 42 and the output terminal $T_{OUT}$, and is used to generate an audio signal Y$_{n}$ by adjustment of the volume of an audio signal Q supplied from the analog bus 42. More specifically, the second adjuster 48 is an amplifier that amplifies the audio signal Q by a variable gain $G_{B\_n}$. The gain $G_{B\_n}$ of the second adjuster 48 is set as variable depending on how the operator $P_2$ of the signal processing device 10$_{n}$ is operated (the position to which the operator $P_2$ is rotated, i.e., the angle of rotation of the operator $P_2$). The audio signal Y$_{n}$ that has been adjusted by the second adjuster 48 is output from the output terminal $T_{OUT}$ to the sound emitting device 24$_{n}$. The second adjuster 48 according to the first embodiment also functions as a headphone amplifier that cuts off an electric current that flows from the analog bus 42 to the sound emitting device 24$_{n}$. The first adjuster 46 and the second adjuster 48 are electrically operated by an electric current supplied from a battery contained inside the case 11, for example. However, it is also possible for the first adjuster 46 and the second adjuster 48 to be electrically operated by an electric current supplied from an external electric source.

Figure 3:
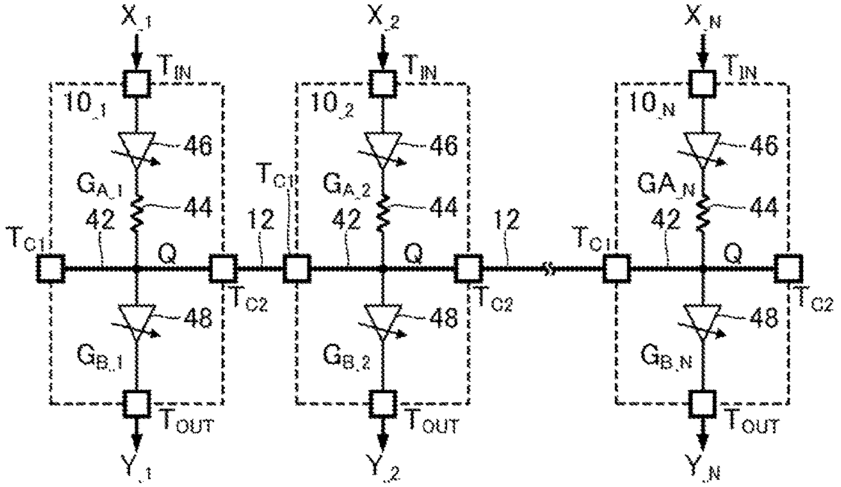
FIG. 3 is an explanatory diagram of a set-up where a plurality of signal processing devices are interconnected.

FIG. 3 explains a relationship between audio signals X$_{n}$ (X$_{1}$ to X$_{N}$) and audio signals Y$_{n}$ (Y$_{1}$ to Y$_{N}$). As FIG. 3 exemplifies, a set-up where the analog buses 42 are interconnected across N signal processing devices 10$_{1}$ to 10$_{N}$ is assumed. According to Kirchhoffs laws, an audio signal Q that arises in an analog bus 42 can be represented by the following mathematical expression (1)

$$(V_{MIX} = G_{A\_1} \cdot X_{-1} + \ldots + G_{A\_N} \cdot X_N), \tag{1}$$

$$Q = (G_{A\_1} \cdot X_{\_1} + G_{A\_2} \cdot X_{\_2} + \ldots + G_{A\_N} \cdot X_{\_N}) / N = \frac{1}{N} V_{MIX}$$

Accordingly, the audio signal Y$_{n}$ output from the output terminal $T_{OUT}$ of the signal processing device 10$_{n}$ can be expressed by the following mathematical expression (2).

$$Y_{\_n} = \frac{1}{N} G_{B\_n} \cdot V_{MIX} \tag{2}$$

As will be understood from the mathematical expression (1) and the mathematical expression (2), the audio signal Y$_{n}$ that consists of a mix of N streams of audio signals X$_{1}$ to $X_{\_N}$, supplied from different signal sources 22$_{\_n}$ is output from the signal processing device 10$_{\_n}$ to the sound emitting device 24$_{\_n}$.

Further, as will be understood from the mathematical expression (2), it is possible to control a volume ratio between the N streams of audio signals $X_{\_1}$ to $X_{\_N}$ within the audio signal $Y_{\_n}$ by having the first adjuster 46 adjust the volume of the audio signal $X_{\_n}$. As will also be understood from the mathematical expression (2), it is possible to adjust a volume of the audio signal $Y_{\_n}$ (i.e., the sound played by the sound emitting device 24$_{\_n}$) while maintaining a volume ratio between the N streams of audio signals $X_{\_1}$ to $X_{\_N}$ by having the second adjuster 48 adjust the volume.

As is explained above, according to the first embodiment, the analog bus 42 is connected to another device through the connecting terminal $T_{C1}$ or the connecting terminal $T_{C2}$, with the analog bus 42 being connected to the input terminal $T_{IN}$ and the output terminal $T_{OUT}$. In this way, it is possible to generate, by use of a simple configuration, an audio signal $Y_{\_n}$ that consists of a mix of the N streams of audio signals $X_{\_1}$ to $X_{\_N}$ that are supplied to the input terminals $T_{IN}$ of different signal processing devices 10$_{\_n}$, to supply the audio signal $Y_{\_n}$ to different sound emitting devices 24$_{\_n}$.

When a configuration is assumed in which the resistance value of the resistive element 44 is sufficiently low (hereinafter, comparative example 2), the resistance components of a connecting cable 12 and connecting terminals $T_C$ ($T_{C1}$ and $T_{C2}$) become relatively dominant, and as a result, it is possible that a volume ratio between the N streams of audio signals $X_{\_1}$ to $X_{\_N}$ may be substantially influenced by the resistance components of the connecting cable 12 and the connecting terminals $T_C$. In addition, in the configuration of comparative example 2, it is possible that an excessive electric current may flow from the output side of the first adjuster 46 of a signal processing device 10$_{\_n}$ into the output side of the first adjuster 46 of another device through an analog bus 42. Taking the foregoing into account, a preferable configuration is one in which the resistance element 44 of each signal processing device 10$_{\_n}$ has a sufficiently high resistance value, for example, a resistance value of 3.3 kΩ. According to this configuration, it is possible to reduce an influence imparted to the volume ratio between the N streams of audio signals $X_{\_1}$ to $X_{\_N}$ by the resistance components of the connecting cable 12 and the connecting terminals $T_C$. Furthermore, it is possible to suppress the occurrence of an excessive electric current that may flow via the analog bus 42.

Generally, in a set-up in which a plurality of audio devices such as mixers are interconnected, an input terminal of one audio device and an output terminal of another audio device must be connected. In the signal processing device 10$_{\_n}$ according to the first embodiment, no distinction is made in different connecting terminals $T_C$ between an input and an output, and therefore, other devices may be connected to any of the connecting terminal $T_{C1}$ and the connecting terminal $T_{C2}$. As a result, a connection error between signal processing devices 10$_{\_n}$ does not occur. Furthermore, since the signal processing device 10$_{\_n}$ is realized by analog circuitry, the present embodiment provides an advantage in that problems such as signal delay and complication of circuitry, both due to A/D conversion and D/A conversion, do not occur.

Second Embodiment

Following is an explanation of the second embodiment. In the first embodiment, the voltage of an audio signal $Y_{\_n}$ tends to decrease as the connection number N of signal processing devices 10$_{\_n}$ increases, as will be apparent from the mathematical expression (1) stated above. The second embodiment has a configuration for suppressing the decrease in voltage of an audio signal $Y_{\_n}$ against the increase of the connection number N. In the below-exemplified embodiments, the elements whose effects and functions are substantially the same as those according to the first embodiment will be assigned the same reference signs as those used in the explanation of the first embodiment, and detailed explanation thereof will be omitted as appropriate.

Figure 4:
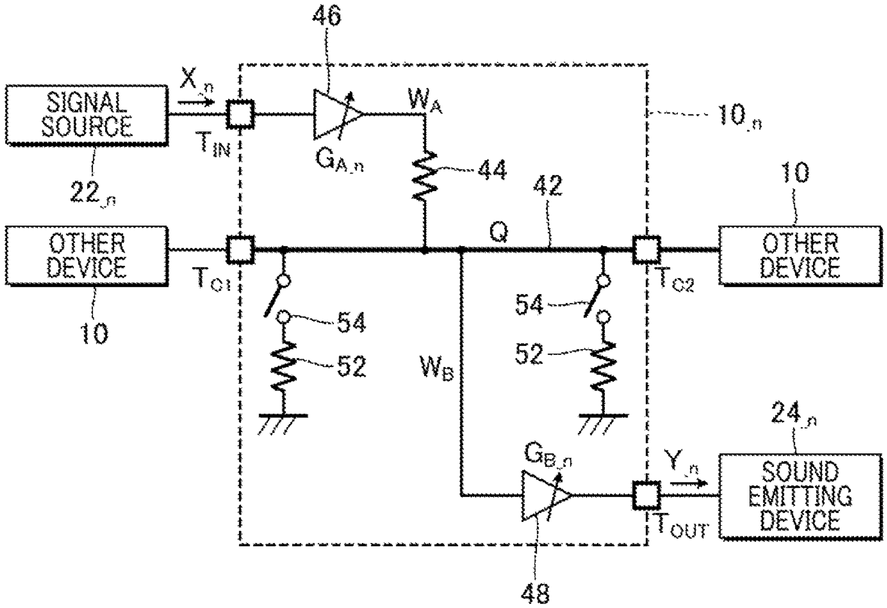
FIG. 4 illustrates a configuration of a signal processing device according to a second embodiment.

FIG. 4 illustrates a configuration of a signal processing device 10 according to the second embodiment. As exemplified in FIG. 4, according to the second embodiment, a resistive element 52 and a connection switcher 54 are connected to each of the connecting terminal $T_C$ ($T_{C1}$ and $T_{C2}$) of the signal processing device 10$_{\_n}$. The resistive element 52 (an example of a second resistive element) is an electric resistance with a resistance value $R_2$.

The connection switcher 54 is a switch for switching the electric connection (conduction or insulation) between the resistive element 52 and an analog bus 42. More specifically, the connection switcher 54 insulates the resistive element 52 from the analog bus 42 during a state of the end plug of a connection cable 12 being inserted in a connection terminal $T_C$ of the signal processing device 10$_{\_n}$ (i.e., when another device is being connected). During a state of when the end plug of a connection cable 12 not being inserted in a connection terminal $T_C$ of the signal processing device 10$_{\_n}$ (i.e., when another device is not being connected), the connection switcher 54 electrically connects the resistive element 52 to the analog bus 42. For example, a publically known switch-attached jack realizes the connection switcher 54 between a connecting terminal $T_C$ and the resistive element 52.

Figure 5:
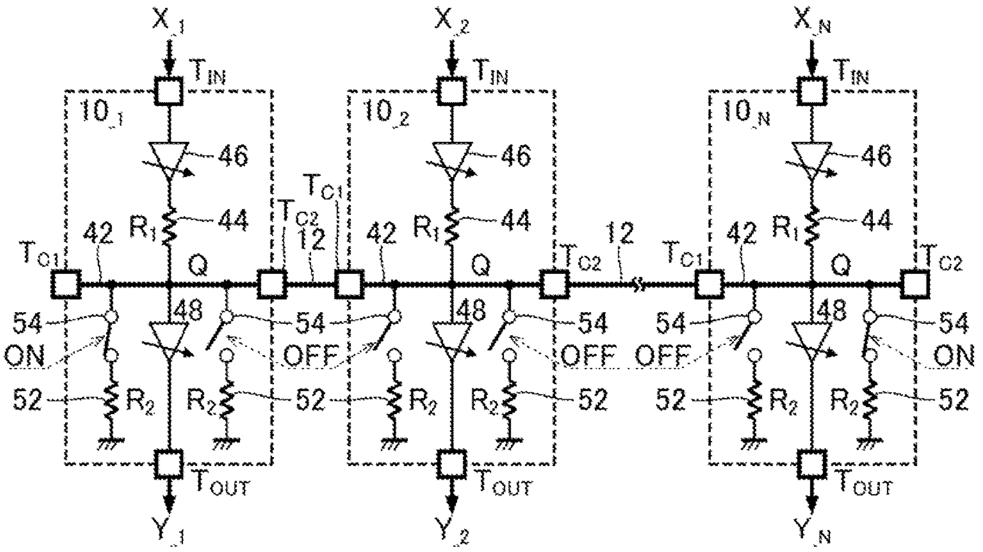
FIG. 5 is an explanatory diagram of a set-up where a plurality of signal processing devices according to the second embodiment are interconnected.
Figure 6:
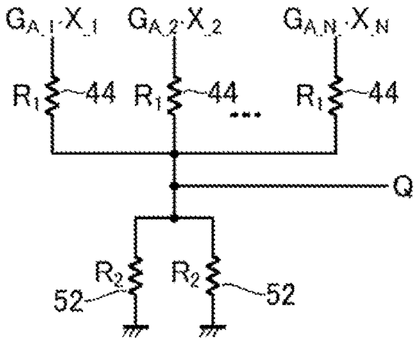
FIG. 6 is an equivalent circuit diagram of FIG. 5.

In FIG. 5, an example set up is illustrated where N signal processing devices 10$_{\_1}$ to 10$_{\_N}$ according to the second embodiment are connected in series. The connecting terminal $T_{C1}$ of the signal processing device 10$_{\_1}$ and the connecting terminal $T_{C2}$ of the signal processing device 10$_{\_N}$ are in an open, separate state. Therefore, as exemplified in FIG. 5, the resistive element 52 is connected to the connecting terminal $T_{C1}$ of the signal processing device 10$_{\_1}$ and the connecting terminal $T_{C2}$ of the signal processing device 10$_{\_N}$, whereas each of the other connecting terminals $T_C$ are insulated from the corresponding resistive element 52. FIG. 6 illustrates an equivalent circuitry of FIG. 5. As will be understood from FIG. 6, the following mathematical expression is established by Kirchhoffs laws. The symbol $R_1$ stands for the resistance value of the resistive element 44.

$$\frac{1}{R_1}\{(G_{A\_1}\cdot X_{\_1}-Q)+(G_{A\_2}\cdot X_{\_2}-Q)+\ldots+(G_{A\_N}\cdot X_{\_N}-Q)\}=\frac{2}{R_2}Q$$

Accordingly an audio signal Q that is conveyed in the analog bus 42 is expressed by the following mathematical expression (3).

$$\begin{aligned} Q &= \frac{R_2}{2R_1+N\cdot R_2}V_{MIX} \\ &= \frac{1}{a+N}V_{MIX} \\ &(R_1 = a\cdot R_2/2) \end{aligned} \tag{3}$$

As will be understood from the mathematical expression (3), in contrast to the first embodiment, in the second embodiment it is possible to suppress a decrease in a voltage of an audio signal $Y_n$ against an increase in the connection number N. For example, according to the first embodiment, the amount of decrease in the voltage of the audio signal $Y_n$ is 12 dB in a case where the connection number N is increased from two to eight. In contrast, in the second embodiment, when a constant a is assumed to be 8 ($R_1=4R_2$), an amount of decrease in the voltage of the audio signal $Y_n$ can be suppressed to 4 dB in a case where the connection number N is increased from two to eight. It is of note that in the first embodiment it is possible to compensate for a decrease in the volume of an audio signal $Y_n$ resulting from an increase in the connection number N, by adjusting the volume of the audio signal $Y_n$ by adjusting the operator $P_2$.

Third Embodiment

Figure 7:
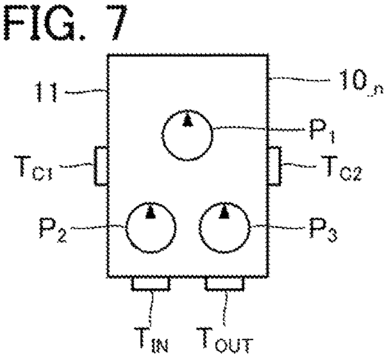
FIG. 7 is an external view of a signal processing device according to a third embodiment.

FIG. 7 is a plan view exemplifying an outer view of a signal processing device 10$_n$ according to the third embodiment. As exemplified in FIG. 7, in the third embodiment an operator $P_3$ is mounted to the case 11 of the signal processing device 10$_n$ in addition to an operator $P_1$ and an operator $P_2$ as explained in the description of the first embodiment. The operator $P_3$ is a knob that a user $U_n$ can freely rotate, similarly to the operator $P_1$ and operator $P_2$.

Figure 8:
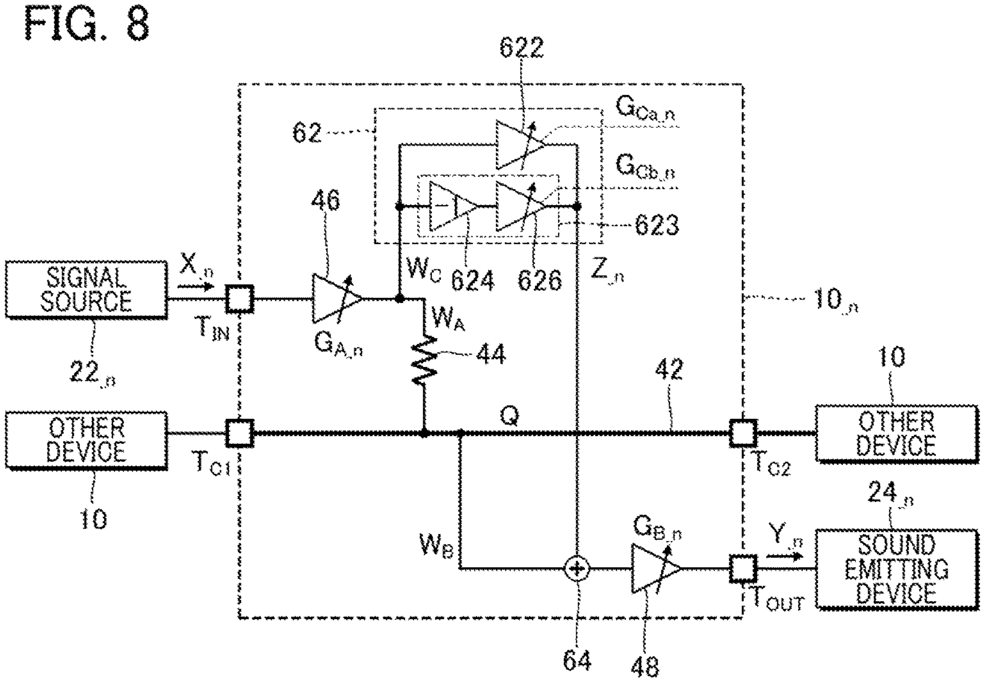
FIG. 8 illustrates a configuration of the signal processing device according to the third embodiment.

FIG. 8 illustrates an electric configuration of the signal processing device 10$_n$ according to the third embodiment. As FIG. 8 exemplifies, the signal processing device 10$_n$ according to the third embodiment is configured such that a third adjuster 62 and a signal adder 64 are added to the configuration of the first embodiment. The third adjuster 62 and the signal adder 64 operate by electricity supplied from a battery or an external electric source, similarly to the first adjuster 46 and the second adjuster 48.

The third adjuster 62 is disposed on a path $W_C$ that branches from a path $W_A$ that is between an input terminal $T_{IN}$ and an analog bus 42. More specifically, the path $W_C$ in FIG. 8 is a path that branches from a point between the first adjuster 46 and a resistive element 44, and it reaches the signal adder 64 without going through the analog bus 42. An audio signal $G_{A\_n} \cdot X\_n$ that has been adjusted by the first adjuster 46 is supplied to the analog bus 42 via the resistive element 44 in substantially the same manner as in the first embodiment. In addition, it is supplied to the third adjuster 62 via the path $W_C$. The third adjuster 62 adjusts the volume of the audio signal $G_{A\_n} \cdot X\_n$ that has been adjusted by the first adjuster 46. An audio signal $Z_n$ that has been adjusted by the third adjuster 62 is supplied to the signal adder 64.

As exemplified in FIG. 8, the third adjuster 62 of the third embodiment includes a normal phase adjuster 622 and a reversed phase generator 623. The normal phase adjuster 622 and the reversed phase generator 623 are interconnected in parallel. The normal phase adjuster 622 adjusts the volume of the audio signal $G_{A\_n} \cdot X\_n$, which is supplied from the path $W_A$ to the path $W_C$. More specifically, the normal phase adjuster 622 is an amplifier that amplifies the audio signal $G_{A\_n} \cdot X\_n$, by a variable gain $G_{Ca\_n}$. The gain $G_{Ca\_n}$ of the normal phase adjuster 622 is set as variable in accordance with how the operator $P_3$ is operated (the position to which the operator $P_3$ is rotated, i.e., the angle of rotation of the operator $P_3$).

The reversed phase generator 623 generates an audio signal the phase of which is a reversal of that of an audio signal $G_{A\_n} \cdot X\_n$ (i.e., a signal the polarity of which is inverted). More specifically, the reversed phase generator 623 includes a phase inverter 624 and a reversed phase adjuster 626 as exemplified in FIG. 8. The phase inverter 624 inverts the phase of the audio signal $G_{A\_n} \cdot X\_n$. Any publically known technique may be freely selected for the phase inversion performed by the phase inverter 624. The reversed phase adjuster 626 adjusts the volume of an audio signal $(-1)G_{A\_n} \cdot X\_n$ that has been inverted by the phase inverter 624. More specifically, the reversed phase adjuster 626 is an amplifier that amplifies the audio signal $(-1) G_{A\_n} \cdot X\_n$ by a variable gain $G_{Cb\_n}$. The gain $G_{Cb\_n}$ of the reversed phase adjuster 626 is set as variable in accordance with how the operator $P_3$ is operated (the angle to which the operator $P_3$ is rotated). More specifically, the gain $G_{Ca\_n}$ and the gain $G_{Cb\_n}$ are adjusted in conjunction with each other so that when either the gain $G_{Ca\_n}$ or the gain $G_{Cb\_n}$ increases, the other decreases. In other words, the volume ratio between the audio signal $G_{A\_n} \cdot X\_n$ and its reversed phase component is adjusted by the normal phase adjuster 622 and the reversed phase adjuster 626. It is of note that it is possible to invert the order of the phase inversion by the phase inverter 624 and the volume adjustment by the reversed phase adjuster 626. As will be understood from the above explanation, the reversed phase generator 623 carries out phase inversion and volume adjustment with respect to the audio signal $G_{A\_n} \cdot X\_n$.

An audio signal $Z_n$ that is obtained by adding an audio signal $G_{Ca\_n} \cdot G_{A\_n} \cdot X\_n$ that has been adjusted by the normal phase adjuster 622, and an audio signal $G_{Cb\_n} \cdot (-1) G_{A\_n} \cdot X\_n$ that has been adjusted by the reversed phase adjuster 626 is supplied from the third adjuster 62 to the signal adder 64. Thus, the audio signal $Z_n$ is represented by the following mathematical expression (4).

$$Z\_n = G_{Ca\_n} \cdot G_{A\_n} \cdot X\_n + G_{Cb\_n} \cdot (-1) G_{A\_n} \cdot X\_n \quad (4)$$

The signal adder of FIG. 8 is disposed between the analog bus 42 and the output terminal $T_{OUT}$. The signal adder 64 generates an audio signal $Y_N$ ($Y\_N = Q + Z\_n$) by adding an audio signal Q supplied from the analog bus 42 and an audio signal $Z_n$ that has been adjusted by the third adjuster 62. In FIG. 8, the signal adder 64 is disposed between the analog bus 42 and the second adjuster 48, but the signal adder 64 may instead be disposed between the second adjuster 48 and the output terminal $T_{OUT}$.

When the gain $G_{Ca\_n}$ of the third adjuster 62 is set to be a small value (i.e., when the gain $G_{Cb\_n}$ is set to be a large value), as will be understood from the mathematical expression (4), the audio signal $G_{Cb\_n} \cdot (-1) G_{A\_n} \cdot X\_n$ that is an inversion of the audio signal $G_{A\_n} \cdot X\_n$ becomes relatively dominant within an audio signal $Z_n$. Accordingly, an audio signal $Y_n$ is generated in which the signal components of the audio signal $X_n$ are suppressed within an audio signal Q that consists of a mix of N streams of audio signals $X_1$ to $X_N$. On the other hand, when the gain $G_{Ca\_n}$ of the third adjuster 62 is set to be a large value (i.e., when the gain $G_{Cb\_n}$ is set to be a small value), as will be understood from the mathematical expression (4), the audio signal $G_{A\_n} \cdot X\_n$ becomes relatively dominant within the audio signal $Z_n$. Accordingly, an audio signal $Y_n$ is generated in which the signal components of the audio signal $X_n$ within the audio signal Q is emphasized. That is, the smaller the value to which the gain $G_{Ca\_n}$ is set, the greater the signal components of the audio signals $X_n$ within the audio signal Q are suppressed; and the larger the value to which the gain $G_{Ca\_n}$ is set, the greater the signal components of the audio signals $X_n$ within the audio signal Q are emphasized. Meanwhile, the audio signal Q that is common among the N signal processing devices 10_1 to 10_N is not influenced by either the gain $G_{Ca\_n}$ or the gain $G_{Cb\_n}$.

As will be understood from the above explanation, according to the third embodiment, it is possible to adjust the volume ratio of the audio signals X_n inputted into the signal processing device 10_n within the sound played by the signal processing device 10_n (audio signal Y_n) without influencing the sounds played by other devices. In other words, a user U_n can selectively adjust a volume of his/her own performance sound by appropriately adjusting the operator $P_3$ while listening to the ensemble sound of music played together by N users U_1 to U_N Through the Sound emitting device 24_n.

In the above explanation, the third embodiment is explained based on the configuration of the first embodiment. However, it is also possible to adopt, to the third embodiment, the configuration of the second embodiment in which a resistive element 52 and a connection switcher 54 are connected to each connection terminal $T_C$ ($T_C$ or $T_{C2}$).

Modifications

The above-mentioned examples may be modified in various ways. Specific modifications are described below. Any two or more modes freely selected from the following examples may be combined as appropriate in so far as they do not contradict each other.

(1) In each of the above-mentioned embodiments, a signal processing device 10_n that was given as an example includes two connection terminals $T_C$ ($T_{C1}$ and $T_{C2}$). However, the number of connection terminals $T_C$ of the signal processing device 10_n is not limited thereto. For example, it is possible to mount three or more connection terminals $T_C$ to a signal processing device 10_n. For example, a maximum of three other devices may be connected to a signal processing device 10_n, wherein the signal processing device 10_n includes three connection terminals $T_C$.

Figure 9:
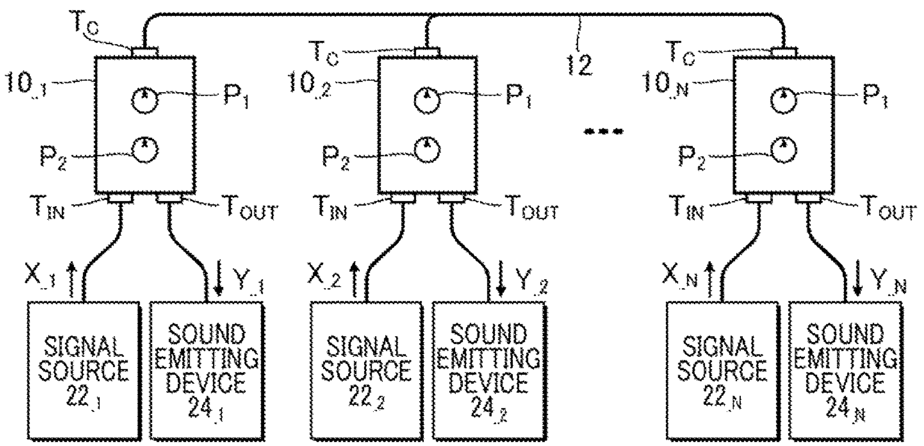
FIG. 9 illustrates a configuration of a sound processing system according to a modification.

It is also possible to mount a single connection terminal $T_C$ to a signal processing device 10_n. In a configuration in which a signal processing device 10_n includes one connection terminal $T_C$, two signal processing devices 10 (10_1 and 10_2) are connected by a single connection cable 12. A configuration in which a signal processing device 10_n includes a plurality of connection terminals $T_C$, such as in the above-mentioned embodiments, enables a large number of signal processing devices 10_n to be readily connected in series, as compared with a configuration in which a signal processing device 10_n includes a single connection terminal $T_C$. As exemplified in FIG. 9, it is also possible to interconnect three or more signal processing devices 10_n each of which includes one connection terminal $T_C$ by use of a connection cable 12 that branches into a plurality of ends.

Figure 10:
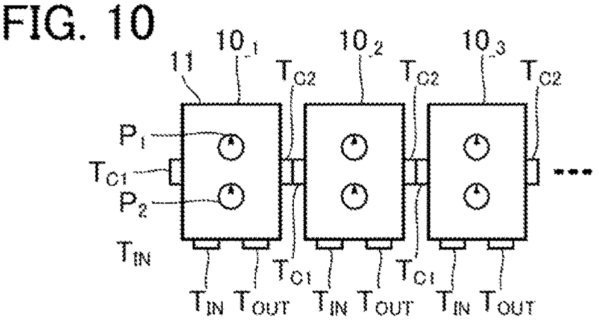
FIG. 10 illustrates a configuration of a sound processing system according to another modification.

(2) In each of the above-mentioned embodiments, connection cables 12 are used to connect different signal processing devices 10_n, but the means of connecting the signal processing devices 10_n is not limited to the previously presented examples. For example, by employing a connector in the form of a connection terminal $T_C$, it is possible to directly connect a connection terminal $T_C$ of a signal processing device 10_n and a connection terminal $T_C$ of a signal processing device 10_n+1 to be in contact with each other as exemplified in FIG. 10.

(3) In the above-mentioned embodiments, a knob that may be rotated by a user U_n is exemplified as an operator P, but the specific form of the operator P is not limited thereto. For example, it is also possible to provide a fader-type operator P that a user U_n may slide linearly.

Figure 11:
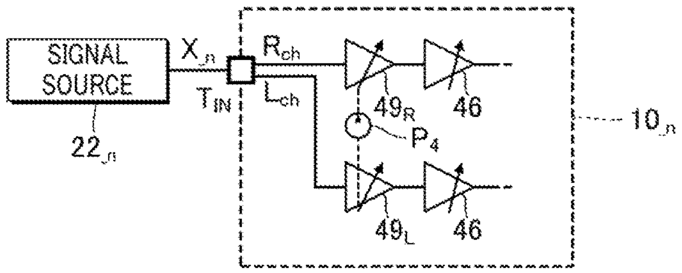
FIG. 11 illustrates a configuration of a signal processing device according to yet another modification.

It is further possible to set an operator $P_4$ that adjusts a volume ratio (a direction of an audio image) between left and right stereo channels, for example. More specifically, as exemplified in FIG. 11, a right adjuster $\mathbf{49}_R$ and a left adjuster $\mathbf{49}_L$ are mounted to the signal processing device 10_n according to each of the different embodiments as mentioned above. The right adjuster $\mathbf{49}_R$ adjusts the volume of an audio signal X_n of the right channel ($R_{ch}$), supplied from the signal source 22_n to the input terminal $T_{IN}$; and the left adjuster $\mathbf{49}_L$ adjusts the volume of an audio signal X_n of the left channel ($L_{ch}$), supplied from the signal source 22_n to the input terminal $T_{IN}$. The respective gains of the right adjuster $\mathbf{49}_R$ and the left adjuster $\mathbf{49}_L$ are adjusted in accordance with operation of the operator $P_4$ (for example, the position to which the operator $P_4$ is rotated, i.e., the angle of rotation of the operator $P_4$). More specifically, the respective gains of the right adjuster $\mathbf{49}_R$ and the left adjuster $\mathbf{49}_L$ are adjusted in conjunction with each other so that when either of the gain of the right adjuster $\mathbf{49}_R$ or the gain of the left adjuster $\mathbf{49}_L$ increases, the other decreases. The audio signal X_n that has been adjusted by the right adjuster $\mathbf{49}_R$ is supplied to the first adjuster 46 of the right channel, and the audio signal X_n that has been adjusted by the left adjuster $\mathbf{49}_L$ is supplied to the first adjuster 46 of the left channel. As will be understood from the above description, according to the configuration exemplified in FIG. 11, the volume ratio (i.e., the pan) between the audio signal X_n of the right channel and the audio signal X_n of the left channel are adjusted.

(4) The configuration of the third adjuster 62 according to the third embodiment is not limited to the example in FIG. 8. For example, it is also possible to use a third adjuster 62 that is configured as exemplified in FIG. 12. The third adjuster 62 of FIG. 12 includes a normal phase adjuster 622, a reversed phase generator 623, and a variable resistance 628. The functions of the normal phase adjuster 622 and the reversed phase generator 623 are substantially the same as those according to the third embodiment. It is of note, however, that the gain $G_{Ca\_n}$ of the normal phase adjuster 622 and the gain $G_{Cb\_n}$ of the reversed phase adjuster 626 are set as predetermined fixed values. Moreover, it is of further note that it is also possible to set as variable the gain $G_{Ca\_n}$ and the gain $G_{Cb\_n}$ according to an instruction from a user, for example.

The variable resistance 628 is an element that sets as variable the mix ratio between an audio signal $G_{Ca\_n} \cdot G_{A\_n} \cdot X\_n$ that has been adjusted by the normal phase adjuster 622 and an audio signal $GC_{b\_n} \cdot (-1) G_{A\_n} \cdot X\_n$ that has been generated by the reversed phase generator 623. The resistance value changes in accordance with operation of the operator $P_3$ (the position to which the operator $P_3$ is rotated, i.e., the angle of rotation of the operator $P_3$). In other words, the mix ratio between the audio signal $G_{Ca\_n} \cdot G_{A\_n} \cdot X\_n$ and the audio signal $GC_{b\_n} \cdot (-1) G_{A\_n} \cdot X\_n$ within an audio signal Z_n is set in accordance with operation of the operator $P_3$. More specifically, the variable resistance 628 includes a resistive element that is connected between the output end of the normal phase adjuster 622 and the output end of the reversed phase generator 623, and a contact point at which it comes in contact with the resistive element. The position of the contact point with the resistive element changes in accordance with operation of the operator $P_3$ Accordingly, an audio signal Z_n is generated at the contact point, the audio signal Z_n being a result of an audio signal $G_{Ca\_n} \cdot G_{A\_n} \cdot X\_n$ and an audio signal $G_{Cb\_n} \cdot (-1) G_{A\_n} \cdot X\_n$ being mixed at a mix ratio corresponding to the position of the contact point. Thus, a generated audio signal Z_n is supplied from the contact point to the signal adder 64. As a result, in the configuration of FIG. 12, just as in the third embodiment, it is possible to selectively adjust a volume of the performance sound of the subject user $U_{\_n}$ from among the playback sound (an audio signal $Y_{\_n}$) of a signal processing device 10$_{\_n}$ without influencing the audio signal Q generated in an analog bus 42 (i.e., the playback sound of other devices).

Figure 12:
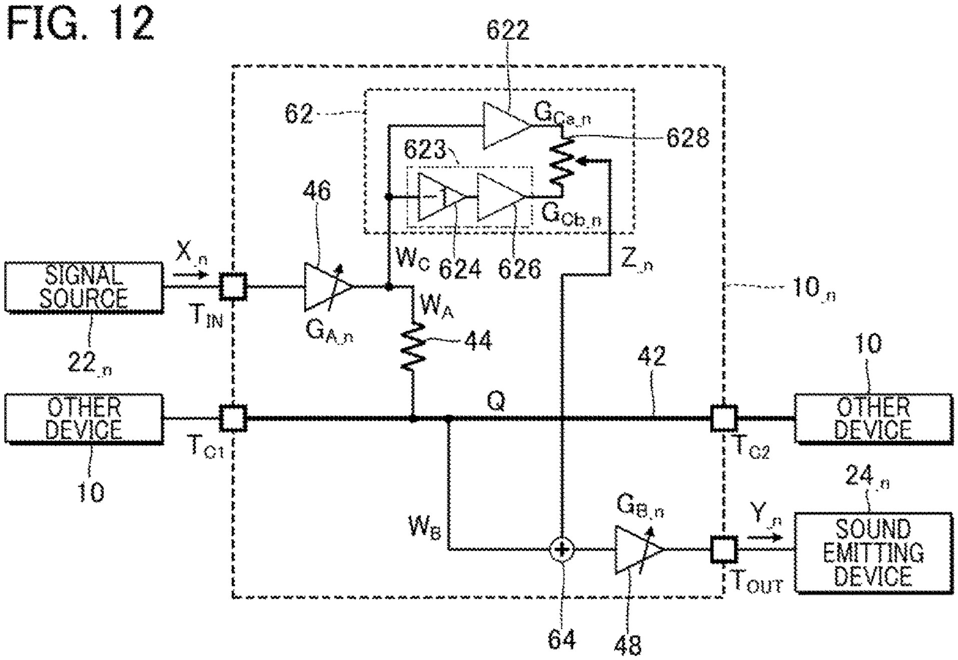
FIG. 12 illustrates a configuration of a signal processing device according to still yet another modification.

The third adjuster 62 exemplified in FIG. 12 functions as an amplifier that amplifies an audio signal $G_{A\_n}\cdot X_{\_n}$ supplied to a path $W_C$ by a gain $G_{C\_n}$. The gain $G_{C\_n}$ of the third adjuster 62 can be set as variable within a range from a minimum value being $-G_{Cb\_n}$ to a maximum value being $G_{Ca\_n}$, inclusive ($-G_{Cb\_n} \leq G_{C\_n} \leq G_{Ca\_n}$), in accordance with how the operator $P_3$ is operated. Where the gain $G_{C\_n}$ is a positive number ($G_{C\_n}>0$), an audio signal $Y_{\_n}$ is generated in which the signal component of an audio signal $X_{\_n}$ within an audio signal Q (i.e., the performance sound of the subject user $U_{\_n}$) is selectively emphasized. On the other hand, where the gain $G_{C\_n}$ is a negative number ($G_{C\_n}<0$), an audio signal $Y_{\_n}$ is generated in which the signal component of an audio signal $X_{\_n}$ within an audio signal Q is selectively suppressed.

Figure 13:
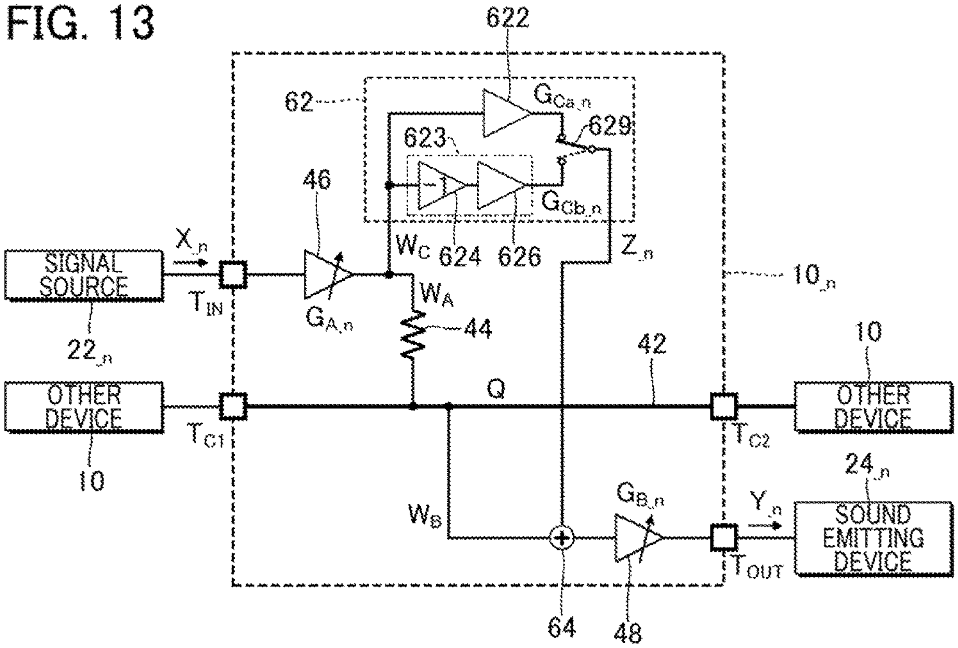
FIG. 13 illustrates a configuration of a signal processing device according to still yet another modification.

As FIG. 13 exemplifies, a switch 629, instead of the variable resistance 628, may be mounted that causes either of the audio signal $G_{Ca\_n}\cdot G_{A\_n}\cdot X_{\_n}$ that has been adjusted by the normal phase adjuster 622 and the audio signal $G_{Cb\_n}\cdot(-1)G_{A\_n}\cdot X_{\_n}$ that has been generated by the reversed phase generator 623 to be selected and outputted as an audio signal $Z_{\_n}$. The switch 629 of FIG. 13 is controlled, for example in accordance with a user's operation, to select the output of the normal phase adjuster 622, or to select the output of the reversed phase generator 623.

(5) The reversed phase generator 623 (the phase inverter 624 and the reversed phase adjuster 626) in the third adjuster 62 exemplified in FIG. 8, FIG. 12, or FIG. 13 may be omitted. For example, in a case in which the third adjuster 62 is configured solely by the normal phase adjuster 622, it is possible to adjust the degree of emphasis of an audio signal $X_{\_n}$ according to the gain $G_{Ca\_n}$, although it is not possible to selectively suppress the signal component of the audio signal $X_{\_n}$ within the audio signal $Y_{\_n}$. Alternatively, the normal phase adjuster 622 of FIG. 8, FIG. 12, or FIG. 13 may be omitted. Furthermore, although in FIG. 8, FIG. 12, and FIG. 13, the third adjuster 62 is mounted in the path $W_C$ that branches from a path between the first adjuster 46 and the resistive element 44, the third adjuster 62 may be mounted in a path $W_C$ that branches from a path between an input terminal $T_{IN}$ and the first adjuster 46.

(6) In the configurations exemplified in FIG. 1 and FIG. 7, the input terminal $T_{IN}$ and the output terminal $T_{OUT}$ are mounted to one side of the case 11, the connecting terminal $T_{C1}$ is mounted to the left side of the case 11, and the connecting terminal $T_{C2}$ is mounted to the right side of the case 11. However the positions of the plurality of terminals ($T_{IN}$, $T_{OUT}$, $T_{C1}$, and $T_{C2}$) are not limited to these examples. For example, the connecting terminal $T_{C1}$, the connecting terminal $T_{C2}$, and the output terminal $T_{OUT}$ may be mounted to one side of the case 11 and the input terminal $T_{IN}$ to another side.

The following configurations may be envisaged from the embodiments described above. That is, a signal processing device according to an aspect of the present invention (the first aspect) includes a plurality of connecting terminals each connected to respective ones of a plurality of other signal processing devices that are different from the subject signal processing device, from among the plurality of signal processing devices; an analog bus connected to the plurality of connecting terminals; an input terminal connected to the analog bus and that accepts an input of a first audio signal; and an output terminal connected to the analog bus and that outputs a second audio signal to a sound emitting device.

According to the first aspect, an analog bus that is connected to an input terminal and an output terminal is connected to a different signal processing device through a connecting terminal. As a result, with a simple configuration it is possible to generate a second audio signal in which a plurality of first audio signals inputted into different signal processing devices are mixed, and output the second audio signal to a sound emitting device.

In the first aspect, each of the plurality of connecting terminals is connected to a different signal processing device. Accordingly, a relatively large number of signal processing devices can be connected as compared with a configuration in which a signal processing device has only one connecting terminal. A configuration that additionally includes a first resistive element that is disposed between an input terminal and an analog bus is also preferable.

A signal processing device according to a preferable example of the first aspect includes a first adjuster disposed between the input terminal and the analog bus, and that adjusts the volume of the first audio signal. According to this preferable example, the first adjuster adjusts the volume of the first audio signal, and thus it is possible to control the volume ratio between a plurality of first audio signals within the second audio signal.

A signal processing device according to another preferable example of the first aspect includes a second adjuster disposed between the analog bus and the output terminal, and that generates a second audio signal by adjusting the volume of an audio signal supplied from the analog bus. According to this preferable example, the second audio signal is generated by adjusting the volume of the audio signal supplied from the analog bus, and thus it is possible to adjust the volume of the second audio signal while maintaining the volume ratio between the plurality of first audio signals.

The signal processing device according to still yet another preferable example of the first aspect includes a second resistive element arranged in correspondence to each of the plurality of connecting terminals; and a connection switcher arranged with respect to the second resistive element, and the connection switcher in a case in which any one of the plurality of other signal processing devices is connected to any one of the plurality of connecting terminals, insulates from the analog bus a second resistive element of the plurality of second resistive elements that corresponds to the connected one of the connecting terminals; and in a case in which none of the plurality of other signal processing devices is connected to one of the plurality of connecting terminals that corresponds to the second resistive element, connects the second resistive element to the analog bus. According to this preferable example, the second resistive element is insulated from the analog bus when another signal processing device is connected to a connection terminal, while the second resistive element is connected to the analog bus when no other signal processing device is connected to the connecting terminal. As a result, a decrease in voltage of the second audio signal can be suppressed, relative to an increase in the number of signal processing devices connected.

The signal processing device according to still yet another preferable example of the first aspect includes: a third adjuster that adjusts a volume of an audio signal supplied to a path branched from a path between the input terminal and the analog bus; and a signal adder disposed between the analog bus and the output terminal and that adds an audio signal supplied from the analog bus and the audio signal that has been adjusted by the third adjuster, and the third adjuster includes a reversed phase generator that performs phase inversion and volume adjustment with respect to the audio signal. According to this preferable example, the audio signal supplied from the analog bus and the audio signal that has been adjusted by the reversed phase generator of the third adjuster are added together, the adjustment being made in the direction in which the volume of the audio signal of the subject device is suppressed. As a result, it is possible to selectively suppress the volume of the audio signal of the subject device within the second audio signal, without influencing the audio signals of the analog buses extending across the plurality of signal processing devices.

In another aspect (the second aspect), a signal processing device may include: at least one connecting terminal connectable to another signal processing device that is different from the subject signal processing device; an analog bus connected to the at least one connecting terminal; an input terminal connected to the analog bus and that accepts an input of a first audio signal; an output terminal connected to the analog bus and that outputs an second audio signal to a sound emitting device; a second resistive element; and a connection switcher that insulates from the analog bus the second resistive element when the another signal processing device is connected to the plurality of connecting terminals and that, connects the second resistive element to the analog bus when the another signal processing devices is not connected to a connecting terminal. As a result, a decrease in voltage of the second audio signal can be suppressed, relative to an increase in the number of signal processing devices connected.

In still another aspect (the third aspect), a signal processing device includes: at least one connecting terminal connectable to another signal processing device that is different from the subject signal processing device; an analog bus connected to the at least one connecting terminal; an input terminal connected to the analog bus and that accepts an input of a first audio signal; an output terminal connected to the analog bus and that outputs an second audio signal to a sound emitting device; an adjuster that adjusts a volume of an audio signal supplied to a path branched from a path between the input terminal and the analog bus; and a signal adder disposed between the analog bus and the output terminal and that adds an audio signal supplied from the analog bus and the audio signal that has been adjusted by the adjuster, and the adjuster includes a reversed phase generator that performs inversion of a phase and the adjustment of a volume with respect to the audio signal. As a result, it is possible to selectively suppress the volume of the audio signal of the subject device within the second audio signal, without influencing the audio signals of the analog buses extending across the plurality of signal processing devices.

With respect to the signal processing device according to still yet another preferable example of the third aspect, the adjuster further includes a normal phase adjuster connected in parallel with the reversed phase generator and that adjusts a volume of the audio signal, and the third adjuster causes a gain set by the reversed phase generator and a gain set by the normal phase adjuster to change in conjunction with each other, so that when either of a gain of the reversed phase generator or a gain of the normal phase adjuster increases, the other decreases. In this preferable example, the volume of the subject device is adjusted in a direction in which the volume is either suppressed or emphasized against the audio signal supplied from the analog bus, in accordance with the ratio between the gain of the reversed phase generator and the gain of the normal phase adjuster. Accordingly, it is possible to selectively adjust the volume of the audio signal of the subject device within the second audio signal without influencing the audio signals of the analog buses extending across a plurality of signal processing devices.

With respect to a signal processing device according to still yet another preferable example of the third aspect, the adjuster further includes a normal phase adjuster connected in parallel with the reversed phase generator and that adjusts a volume of the audio signal; and a variable resistance connected between an output end of the reversed phase generator and an output end of the normal phase adjuster, and that sets as variable a mix ratio between an audio signal outputted from the reversed phase generator and an audio signal outputted from the normal phase adjuster. In this preferable example, the volume of the subject device is adjusted in a direction in which the volume is either suppressed or emphasized against the audio signal supplied from the analog bus, in accordance with the mix ratio between the audio signal outputted from the reversed phase generator and the audio signal outputted from the normal phase adjuster. Accordingly, it is possible to selectively adjust the volume of the audio signal of the subject device within the second audio signal without influencing the audio signals of the analog buses extending across a plurality of signal processing devices.

With respect to the signal processing device according to still yet another preferable example of the third aspect, the adjuster further includes a normal phase adjuster connected in parallel with the reversed phase generator; and a switch that selectively outputs either one of an audio signal outputted from the reversed phase generator and an audio signal outputted from the normal phase adjuster. In this preferable example, the volume of the subject device is adjusted in a direction in which the volume is either suppressed or emphasized against the audio signal supplied from the analog bus, in accordance with either the audio signal outputted from the reversed phase generator or the audio signal outputted from the normal phase adjuster. Accordingly, it is possible to selectively adjust the volume of the audio signal of the subject device within the second audio signal without influencing the audio signals of the analog buses extending across a plurality of signal processing devices.

Description of Reference Signs

100 . . . audio processing system, 10_$_n$ (10_$_1$ to 10_$_N$) . . . signal processing device, 11 . . . case, 12 . . . connecting cable, 22_$_n$ (22_$_1$ to 22_$_N$) . . . signal source, 24_$_n$ (24_$_1$ to 24_$_N$) . . . sound emitting device, 42 . . . analog bus, 44 . . . resistive element (first resistive element), 46 . . . first adjuster, 48 . . . second adjuster, 49$_R$ . . . right adjuster, 49$_L$ . . . left adjuster, 52 . . . resistive element (second resistive element), 54 . . . connection switcher, 62 . . . third adjuster, 622 . . . normal phase adjuster, 623 . . . reversed phase generator, 624 . . . phase inverter, 626 . . . reversed phase adjuster, 628 . . . variable resistance, 629 . . . switch, 64 . . . signal adder.

What is claimed is:

1. A signal processing device comprising:

at least one connecting terminal connectable to another signal processing device that is different from the subject signal processing device;

an analog bus connected to the at least one connecting terminal;

an input terminal connected to the analog bus and that accepts an input of a first audio signal;

an output terminal connected to the analog bus and that outputs a second audio signal to a sound emitting device;

an adjuster that adjusts a volume of an audio signal supplied to a path branched from a path between the input terminal and the analog bus; and a signal adder disposed between the analog bus and the output terminal and that adds an audio signal supplied from the analog bus and the audio signal that has been adjusted by the adjuster, wherein the adjuster comprises:

a reversed phase generator that performs inversion of a phase and the adjustment of a volume with respect to the audio signal; and a normal phase adjuster connected in parallel with the reversed phase generator, and that adjusts a volume of the audio signal.

2. The signal processing device according to claim 1, wherein the adjuster causes a gain set by the reversed phase generator and a gain set by the normal phase adjuster to change in conjunction with each other, so that when either of the gain of the reversed phase generator or the gain of the normal phase adjuster increases, the other decreases.

3. The signal processing device according to claim 1, wherein the adjuster further comprises:

a variable resistance connected between an output end of the reversed phase generator and an output end of the normal phase adjuster, and that sets as variable a mix ratio between an audio signal output from the reversed phase generator and an audio signal output from the normal phase adjuster.

4. The signal processing device according to claim 1, wherein the adjuster further comprises:

a switch that selectively outputs either one of an audio signal output from the reversed phase generator or an audio signal output from the normal phase adjuster.

5. A signal processing device comprising:

at least one connecting terminal connectable to another signal processing device that is different from the subject signal processing device;

an analog bus connected to the at least one connecting terminal;

an input terminal connected to the analog bus and that accepts an input of a first audio signal;

an output terminal connected to the analog bus and that outputs a second audio signal to a sound emitting device;

an adjuster that adjusts a volume of an audio signal supplied to a path branched from a path between the input terminal and the analog bus; and a signal adder disposed between the analog bus and the output terminal and that adds an audio signal supplied from the analog bus and the audio signal that has been adjusted by the adjuster, wherein the adjuster comprises:

a reversed phase generator that performs inversion of a phase and the adjustment of a volume with respect to the audio signal;

a normal phase adjuster connected in parallel with the reversed phase generator and that adjusts a volume of the audio signal; and a variable resistance connected between an output end of the reversed phase generator and an output end of the normal phase adjuster, and that sets as variable a mix ratio between an audio signal output from the reversed phase generator and an audio signal output from the normal phase adjuster.

* * * * *